United States Patent

[11] 3,633,266

[72] Inventor Glen A. Taylor
    Richmond, Va.
[21] Appl. No. 830,595
[22] Filed June 5, 1969
[45] Patented Jan. 11, 1972
[73] Assignee Reynolds Metals Company
    Richmond, Va.

[54] METHOD OF SOLDERING ALUMINOUS COMPONENT
    20 Claims, 4 Drawing Figs.

[52] U.S. Cl.................................................. 29/488,
    29/497.5, 29/502, 285/287
[51] Int. Cl........................................................ B23k 1/20,
    B23k 31/02
[50] Field of Search............................................. 29/502,
    474.4, 479, 482, 497.5, 511, 488; 285/287, 382,
    382.1, 382.2, 382.5

[56] References Cited
    UNITED STATES PATENTS

| | | | |
|---|---|---|---|
| 1,193,667 | 8/1916 | Corey............................ | 29/502 X |
| 1,911,775 | 5/1933 | Smith et al..................... | 285/374 X |
| 2,224,145 | 12/1940 | Dugan et al.................... | 29/502 X |
| 2,397,400 | 3/1946 | Borwich......................... | 29/502 |
| 2,504,625 | 4/1950 | Barnhart et al................. | 285/382.2 X |
| 2,987,813 | 6/1961 | Pope et al....................... | 29/502 X |
| 3,032,870 | 5/1962 | Rohrberg et al................ | 29/502 X |
| 3,055,098 | 9/1962 | Bratkowski et al............. | 29/502 X |
| 3,066,406 | 12/1962 | White............................. | 29/502 X |
| 3,100,330 | 8/1963 | Rice et al........................ | 29/492 X |
| 3,101,874 | 8/1963 | Roseberry...................... | 29/502 X |
| 3,124,874 | 3/1964 | Woolley......................... | 29/520 X |

FOREIGN PATENTS

| | | | |
|---|---|---|---|
| 671,383 | 10/1963 | Canada......................... | 29/502 |

OTHER REFERENCES

American Welding Society's Soldering Manual, 1959, pp. 120–127.

American Welding Society's Welding Handbook, Sec. 4, 1966, pp. 69.120– 69.125

Howard H. Manko, Solders and Soldering, 1964, pp. 280–287.

*Primary Examiner*—John F. Campbell
*Assistant Examiner*—Ronald J. Shore
*Attorney*—Glenn, Palmer, Lyne, Gibbs & Thompson

ABSTRACT: A component made of a material containing aluminum and particularly adapted to be joined to an associated article by fluxless soldering and a method of providing such fluxless soldering.

FIG-1

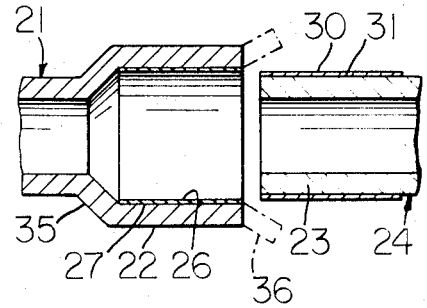

PROVIDING A SOLID COATING OF SOLDER ON A SURFACE OF AT LEAST ONE OF A PLURALITY OF COMPONENTS TO BE JOINED

↓

HEATING THE SOLDER TO AT LEAST ITS MELTING POINT

↓

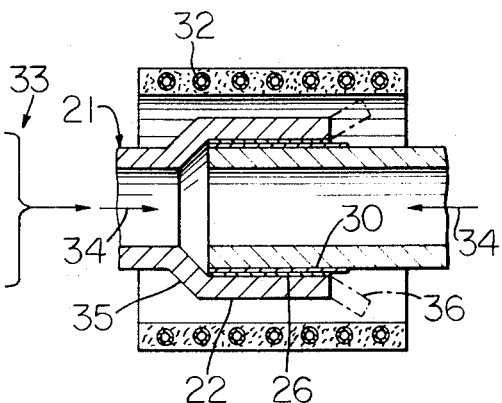

RELATIVELY MOVING THE COMPONENTS WITH THE COATING IN CONTACT WITH A COOPERATING SURFACE OF ANOTHER OF SAID COMPONENTS

↓

COOLING THE SOLDER TO BOND THE ADJOINING COMPONENTS TOGETHER

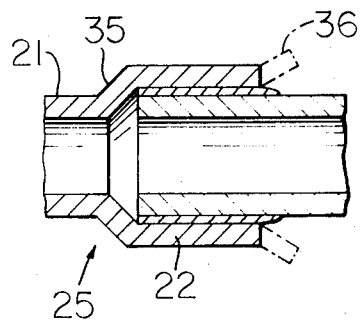

INVENTOR
GLEN A. TAYLOR

BY Glenn, Palmer, Lyne, Gibles & Thompson

HIS ATTORNEYS

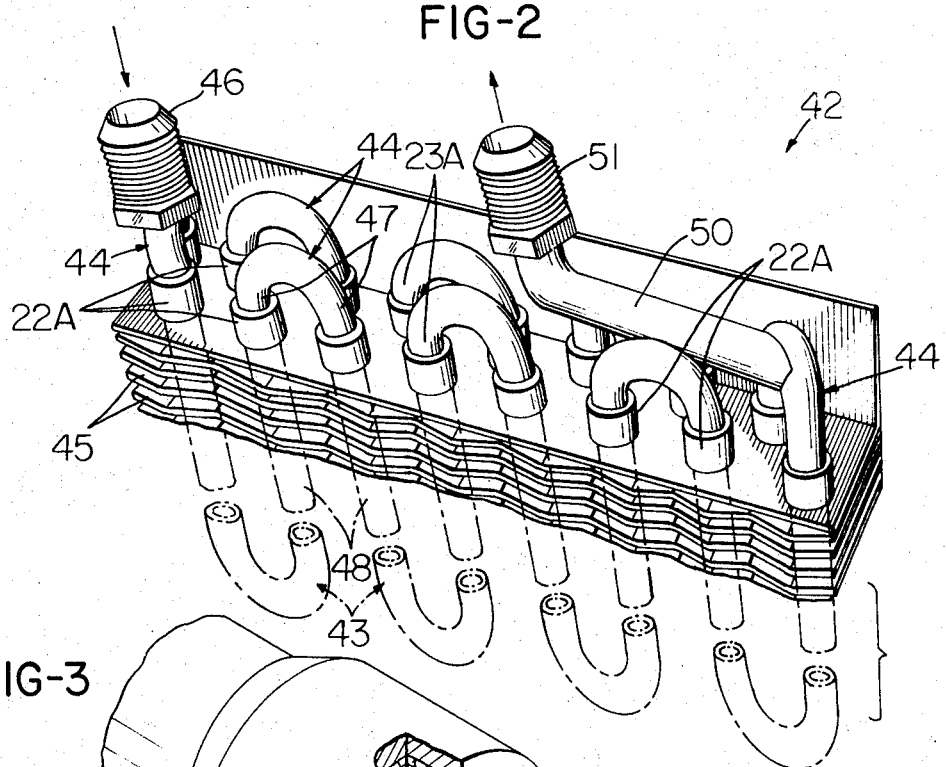
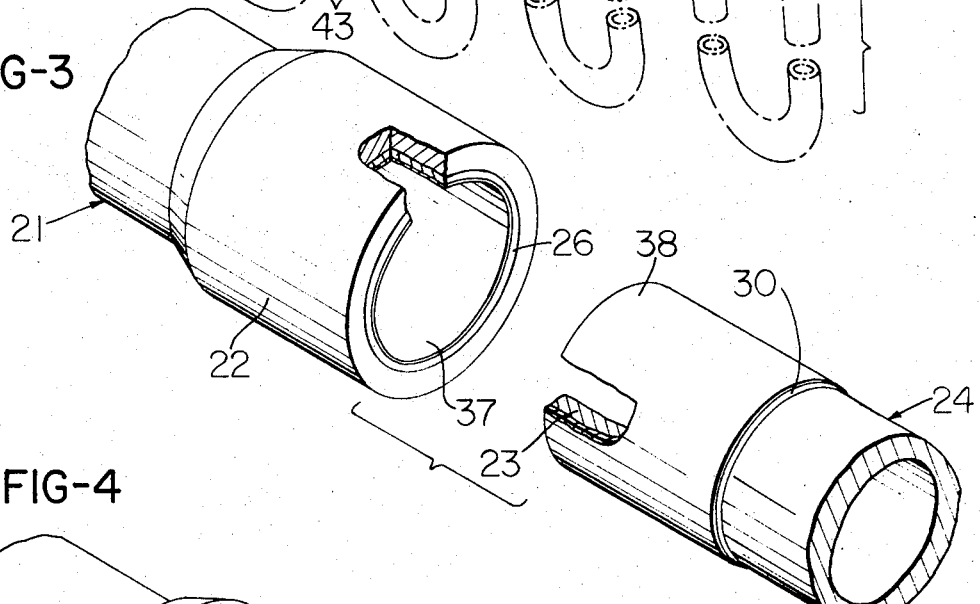
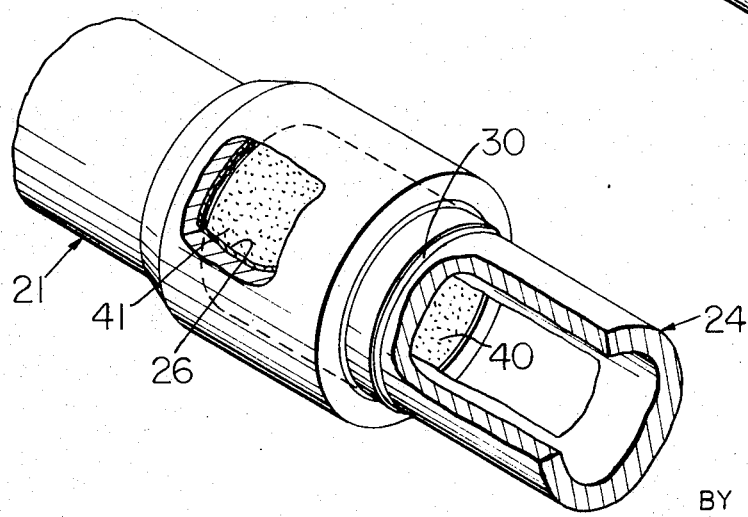

3,633,266

METHOD OF SOLDERING ALUMINOUS COMPONENT

BACKGROUND OF THE INVENTION

In soldering a component made of a material containing aluminum to an associated article it is common practice to use a flux to clean the surface which is to be joined of any undesirable materials, such as an oxide coating, for example, which may be present thereon. However, the flux used in providing a soldered joint generally tends to provide a joint which is more susceptible to corrosion.

SUMMARY

This invention provides a component made of a material containing aluminum which is particularly adapted to be joined to an associated article by fluxless soldering and an improved fluxless soldering method which provides a high-strength fluidtight joint which eliminates corrosion problems of the type normally introduced when using a soldering flux.

Other details, uses, and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention, in which:

FIG. 1 is a schematic diagram with blocks presented to indicate various steps of the method of this invention while also illustrating, adjacent each block, fragmentary portions (in section) of a pair of cooperating components being joined together in accordance with such method steps;

FIG. 2 is a fragmentary perspective view of the upper portion of an exemplary heat exchanger having parts made and assembled in accordance with this invention and also showing certain parts by dotted lines;

FIG. 3 is an enlarged fragmentary perspective view illustrating a bell end of a tubular component and a spigot end of a cooperating tubular component with parts in cross section and parts broken away and particularly illustrating in an exaggerated manner a coating of solder which is provided on the joint-defining surface of each of the ends and an oxide film on each coating; and FIG. 4 is a perspective view of the tube ends of FIG. 3 partially assembled together and particularly illustrating in an exaggerated manner and by granular effect the manner in which the oxide film has been broken up by relatively moving the components with the film in contact with adjoining materials.

DESCRIPTION OF ILLUSTRATED EMBODIMENTS

Reference is now made to FIG. 1 of the drawings which presents in block diagram form certain method steps utilized in joining a pair of components at least one of which is an aluminous component, i.e., made of a material containing aluminum. In particular, it will be seen that in the exemplary method indicated generally at 20 a first tubular component or tube 21 is provided and has a bell end 22 which is particularly adapted to receive a spigot end 23 of a tubular component or tube 24. The exemplary tubes 21 and 24 are particularly adapted to be joined together utilizing a fluxless soldering process or method to define a high-strength fluidtight tubular assembly 25 which is illustrated in the lower right-hand corner of FIG. 1.

In this example, both tubes 21 and 24 will be described as being made of either aluminum or an aluminum alloy; however, it will be appreciated that the method of this invention may be used in joining metallic components or workpieces by fluxless soldering wherein only one of the components is made of a metallic material containing aluminum.

The bell end 22 of the tube 21 is provided with a solid coating 26 of solder on its joint-defining inside surface 27. Similarly, the spigot end 23 of the tube 24 is provided with a solid coating 30 of solder on its joint-defining male surface 31.

The solder defining the coatings 26 and 30 is then heated to at least its melting temperature or point and the tubes 21 and 24 are relatively moved with each coating 26 and 30 in contact with a cooperating surface to provide a breakup of the exterior surface of each coating. In this illustration, the tubes 21 and 24 are relatively moved with the coatings 26 and 30 in firm contact with each other to provide a breakup of the exterior surface of each coating and assure the provision of an optimum bond between the tubes 21 and 24.

The heating of the solder defining each coating 26 and 30 may be accomplished using any suitable known technique and is preferably achieved by also heating the associated end portions of the tubes 21 and 24 to a comparatively high temperature approaching the melting point of the solder whereby the soldered joint defined in this manner has optimum strength. In this example, the heating action is shown as being accomplished by an electrical induction coil 32 which provides a simultaneous heating of the coatings 26 and 30 of solder and the associated end portions of the tubes 21 and 24 respectively.

The heating of the tubes 21 and 24 and their associated coatings 26 and 30 may be accomplished as a separate step with the tube ends apart from each other and this fact is highlighted by the separate blocks shown in FIG. 1 of the drawings. The relative movement may be accomplished to assemble the associated ends 22 and 23 and/or after ends 22 and 23 have been assembled after heating. It will also be appreciated that such heating and relative movement may be achieved simultaneously as indicated by the bracket at 33, and the arrows 34 in FIG. 1.

In any event, after heating and relatively moving the bell end 22 and spigot end 23 with their coatings 26 and 30 in firm contact with each other, there is a substantial breakup of the outside surface of the coatings 26 and 30 which is generally in the form of an oxide film. The breakup of such film enables an optimum bond to be provided between the bell end 22 and the spigot end 23 upon cooling the solder to define the assembly 25 and such film breakup is preferably provided by designing the cooperating male and female end portions of associated components so as to provide an interference fit therebetween without taking into account the thickness of the solidified coating of solder provided on associated joint-defining or mating surfaces.

The bell end 22 of the tube 21 is shown as having a substantially right circular cylindrical inside surface 27 which is adapted to receive the spigot end 23 of the tube 24 and the cylindrical surface 27 has a transition surface 35 interconnecting the surface 27 with the main inside surface of the tube 21. However, it will be appreciated that the bell end 22 and cooperating spigot end 23 may have any desired cooperating configurations, such as, substantially frustoconical, substantially frustopyramidal, or be defined by any desired surface of revolution. Irrespective of the detailed matched configurations of a bell end 22 and cooperating spigot end 23 the dimensions of these cooperating components assure that an interference fit will be provided between associated joint-defining surfaces to assure a breakup of any oxide film, inclusion, or the like that may be on the surface of each particular solid coating of solder provided on such surfaces.

The bell end 22 of tube 21 may be provided with an outwardly flaring inlet portion 36, shown by dotted lines at three locations in FIG. 1 of the drawings, and the outwardly flaring portion 35 may be provided irrespective of the particular configuration of a given bell end. For example, a substantially frustoconical or cup-shaped bell end may have a widely flaring inlet portion. The widely flaring inlet portion enables a cooperating spigot end of an associated tube to be installed in position in an easier manner and while utilizing automatic assembly equipment and techniques.

To highlight the action that takes place during the joining of the bell end 22 to the spigot end 23 of the tubes 21 and 24 respectively, particular reference is now made to FIG. 3 of the drawings wherein the coatings 26 and 30 are shown as having films 37 and 38 respectively developed thereon and each film will be considered and described as being comprised primarily of oxides. After heating and relative movement of the ends 22 and 23 the oxide films 37 and 38 are substantially broken up and such broken films are designated by the reference numerals 40 and 41 respectively and represented by granular showings in FIG. 4 for ease of presentation.

This breakup of each oxide film may be achieved in a number of ways and in essence is provided by contacting the outer surface of the associated coating of solder against adjoining materials or surfaces. Because the ends 22 and 23 are normally designed to provide an interference fit even without their respective coatings 26 and 30 applied thereon, portions of the films 37 and 38 may actually be scraped so as to be moved away from the areas of contact of the joined surfaces of the ends 22 and 23. However, whether any scraping takes place and the extent thereof depends upon the character of the relative movement between the bell end 22 and the spigot end 23 which provides the breakup of the oxide films 37 and 38.

In the exemplary presentation of FIGS. 1, 3, and 4, the relative movement between the bell end 22 and the spigot end 23 is shown as axial relative movement and it will be noted from FIG. 4 that such axial movement has not been completed, whereby during such relative movement the breakup of the oxide film takes place in the manner described above. However, it must be understood that such relative movement may be any form of relative movement and may be relative rotation of the type provided by relatively rotating the spigot end within the bell end. Further, such relative movement may be provided by imparting relative radial movement between the spigot end and bell end of the character which would be provided by vibrating the tubes 21 and 24 during assembly thereof or of the character which would be provided by forming a substantially cup-shaped or bell end in position around and against a cooperating spigot end. In addition, such relative movement may be provided by a combination of two or more of the basic movements described above.

Thus, it will be appreciated that the particular type of relative movement which is provided is not controlling, it is only necessary that such movement actually occur and it has been found by test that the magnitude thereof may be quite small in many applications. For example, a movement of 0.001 inch has been found adequate. Obviously, in those applications where relative axial movement of the type illustrated in FIG. 1 is utilized to also assemble the cooperating tube ends together then the movement may be substantial and may correspond to the axial length that the ends are actually telescoped.

Each component made of a material containing aluminum preferably has its solid coating of solder placed in position on its joint-defining surface either during or immediately following breakup of the oxide film or coating which is normally present on such component. The breakup of the oxide film to enable application of such solid coating of solder, or pretinning as it is often referred to, may be achieved by any suitable means to assure the solder will be in contact with the base metal; for example, the oxide film on the aluminum surface may be broken up by mechanical abrasion or using ultrasonic techniques.

As previously indicated, the cooperating mating components which are joined by fluxless soldering in accordance with this invention are preferably provided with an interference fit prior to pretinning. In the case of surfaces of revolution such as ends 22 and 23 which have cooperating right circular cylindrical configurations the dimensions are such that the outside diameter of the spigot end ranges between roughly 0.002 inch and 0.015 inch larger than the inside diameter of the bell end whereby the interference fit is controlled in a positive manner prior to the application of the coating of solder on either the inside surface of the bell end 22, the outside surface of the spigot end 23, or both.

The thickness of the coating of solder which is applied on either the inside surface of the bell end 22 or the cooperating outside surface of a spigot end 23 or on both surfaces is generally of the order of a few ten thousandths of an inch. In one application of this invention satisfactory results were obtained with a coating of solder 0.0005 inch thick provided on both the associated joint-defining surfaces of the bell end and the spigot end.

By controlling the interference fit between cooperating components essentially in the manner presented above and also controlling the thickness of the coating of solder to a few ten thousandths of an inch there is a breakup of the oxide film, or the like, present on the outside surface of the solder coating as described earlier and it is also believed that there may be a disruption of some of the solder coating on the base metal as well as further disruption of small areas of any oxide film that may have been covered over by the solder coating to thereby further assure the provision of a high-quality joint.

This invention enables a manufacturer to provide preformed components of standard size each having one or more joint-defining surfaces suitably coated with solder, i.e., pretinned, and dimensioned so as to enable assembly with cooperating standard components so as to assure the disruption of oxide film from the coating of solder in the forming of a solder joint in the manner described above while minimizing the amount of equipment that a user of components must provide. It will also be appreciated that workpieces or components and surfaces being joined may have any desired shape or configuration and be of either solid or tubular cross-sectional configurations and may be provided for any number of applications where components made of a material containing aluminum are utilized. For example, sheets, plates, rods, etc., may all be easily soldered in accordance with this invention.

In the case of tubular components used in the heat exchanger 42 shown in FIG. 2, the tubular components include a plurality of curved tubes in the form of hairpin components 43 and return bend components 44 which may be used together with secondary surfaces or fins 45 to define the main parts of the heat exchanger 42. The exemplary heat exchanger 42 has an inlet 46 which is placed in flow communication with a return bend component 44 which may have its legs 47 suitably soldered to associated legs 48 of a pair of hairpin components 43. The hairpin components 43 and return bend components 44 are arranged in fluid flow communication so that fluid flows in at inlet 46, travels through the components 43 and 44 and exits from a return bend component 44 through an outlet tube 50 which is connected in fluid flow communication with an externally threaded outlet fitting 51.

In the illustration of FIG. 2, each U-shaped hairpin component 43 is provided with a pair of bell ends each designated by the same reference numeral 22A and each U-shaped return bend component is provided with a pair of spigot ends each designated by the same reference numeral 23A. However, the hairpin components 43 may be provided with spigot ends instead of bell ends and the return bend components 44 may be provided with bell ends instead of spigot ends or each may have a bell end and a spigot end, if desired. It will also be appreciated that the particular configurations of the components, such as components 43 and 44, of a particular heat exchanger may have any suitable configuration. Further, the hairpin components may be provided with a solid coating of solder along their entire outside surface so as to enable easy attachment of the fins 45 thereagainst in a similar manner as previously described in connection with the joining of the cooperating ends 22 and 23 of tubes 21 and 24 respectively.

The method of this invention is particularly adapted to provide high-strength fluidtight soldered joints of a plurality of components made of aluminum or aluminum alloys and it has been found by tests that 1200 and 3003 series aluminum alloys are especially easy to solder in accordance with this invention. Also, the teachings of this invention are fully applicable to the soldering of an aluminous component to one or more components made of other materials such as brass, copper, and other materials usually considered unsolderable, such as borosilicate glass, ceramics, titanium, stainless steel, etc.

The solder used to provide a solid coating of a few ten thousandths of an inch on the joint-defining surface is preferably in the form of a zinc base alloy which may contain up to about 10 percent aluminum by weight. Satisfactory results have been obtained using a zinc base solder comprised of about 2 to 5 percent aluminum, up to about 5 percent copper, and up to about 1 percent magnesium by weight. A solder sold under the trade name of Ney 380 has been especially effective in soldering aluminous components. Ney 380 is a product manufactured by Ney Metals, Inc., of Brooklyn, New York, and is comprised of 90 percent zinc, 5 percent aluminum, 4.9 percent copper, and 0.1 percent magnesium.

As previously explained the component being soldered and its solder preferably are heated to at least the melting point of the solder and excellent results have been obtained utilizing solders having a comparatively high-melting point generally of the order of 700°–850° F.

In the tubular assembly 25 both joint-defining surfaces, i.e., the outside surface 31 of the spigot end 23 and the inside surface 27 of the bell end 22, have been provided with solid coatings of solder and it has been found by tests that best results are obtained utilizing this technique. However, it will be appreciated that a good quality joint may also be obtained using the fluxless soldering techniques of this invention by applying a solid coating of solder on only one of such joint-defining surfaces and it is immaterial whether such coating is on the bell end or the spigot end in the case of tubular components.

While present exemplary embodiments of this invention and methods of practicing the same have been illustrated and described, it will be recognized that this invention may be otherwise variously embodied and practiced by those skilled in the art.

What is claimed is:

1. The method of joining tubular components of similar cross-sectional size and shape, at least one of said components being made of aluminum or aluminum alloy, comprising the steps of providing tubular components having a solid coating of solder on at least one of an inner peripheral surface of one component and an outer peripheral surface of another component, said components being adapted for assembly to achieve a force fit between said surfaces, forcing said outer surface axially inwardly of said inner surface, relatively moving said components with said surfaces in telescoping relationship, heating said solder to at least its melting point, said heating and moving being coordinated to provide melted solder between said surfaces as said moving proceeds, and cooling the melted solder to bond said components together.

2. The method as set forth in claim 1 in which said solder is a zinc base alloy comprising up to about 10 percent aluminum by weight.

3. The method as set forth in claim 1 in which said solder is a zinc base alloy comprising about 2 percent to 5 percent aluminum, up to about 5 percent copper, and up to about 1 percent magnesium by weight.

4. The method as set forth in claim 1 in which said steps of heating and relatively moving are accomplished substantially simultaneously.

5. The method as set forth in claim 1 in which said components have interior passageways of substantially the same cross-sectional size and shape, including the step of enlarging an end portion of one component to provide an inner surface adapted to receive said outer surface of the other component with their passageways aligned.

6. The method as set forth in claim 5 including enlarging said end portion to provide a substantially cylindrical inner surface extending axially inwardly thereof.

7. The method of claim 5 including enlarging said end portion to provide an inner surface having a frustoconical configuration.

8. A method of joining at least one of the substantially parallel legs of a tubular return bend component to a corresponding tubular element as set forth in claim 1, without rotating said component, wherein said moving comprises axially relatively moving said element and component while maintaining said firm contact.

9. A method of concurrently joining each of the substantially parallel legs of a tubular return bend component to an end of corresponding tubular hairpin components as shown in FIG. 2, by the method of claim 1, wherein said moving comprises relatively moving said components lengthwise of said legs while maintaining said firm contact.

10. The method of claim 1 wherein the providing of said tubular components includes providing one component having a bell end and the other having a spigot end, said components being adapted for assembly in telescoping relationship by forcing an outer surface of said spigot end into an inner surface of said bell end.

11. The method as set forth in claim 10 in which, both of said components are made of aluminum or aluminum alloy, and, said step of providing a solid coating of solder comprises providing a solid coating on both the inside surface of said bell end and the outside surface of said spigot end.

12. The method as set forth in claim 11 in which said solder comprises a zinc base alloy.

13. The method as set forth in claim 10 in which the inside surface of said bell end and the outside surface of said spigot end are dimensioned so as to provide an interference fit prior to the application of said solid coating of solder.

14. The method as set forth in claim 13 in which said inside surface of said bell end has a substantially cylindrical configuration having a given diameter and said outside surface of said spigot end has a cooperating substantially cylindrical configuration and a diameter which is larger than said given diameter to provide said interference fit.

15. The method as set forth in claim 13 in which said bell end has an outwardly flaring inlet portion which enables an associated spigot end to be installed in position in an easier manner.

16. The method as set forth in claim 13 in which said step of relatively moving comprises relatively axially moving said spigot end within said bell end.

17. The method as set forth in claim 13 in which said step of relatively moving comprises relatively rotating said spigot end within said bell end.

18. The method as set forth in claim 13 in which said step of relatively moving comprises imparting relative radial movement between said spigot end and bell end.

19. The method as set forth in claim 13 in which said solder is a zinc base alloy comprising about 2 to 5 percent aluminum, up to about 5 percent copper, and up to about 1 percent magnesium by weight, said solid coating of solder having a thickness generally of the order of a few ten thousandths of an inch.

20. The method of joining pretinned tubular components having interior passageways of substantially the same cross-sectional size and shape, at least one of said components being made of aluminum or aluminum alloy, comprising the steps of:

enlarging an end portion of one component to form a substantially cylindrical inner surface extending axially inwardly thereof, adapted to receive an outer peripheral surface of the other component with their passageways aligned, and having a smaller diameter than said outer surface;

providing said components with a solid coating of solder on each of said surfaces, said coatings affording all of the solder needed for said joining;

heating said components to melt the solder;

relatively moving said components in telescoping relationship;

progressively increasing the axial overlap of said surfaces;

maintaining both components in firm contact with the melted solder in a region of said increasing overlap at the desired location for bonding; and cooling the melted solder to bond said components together.

* * * * *